US012754678B2

(12) United States Patent
Singla et al.

(10) Patent No.: US 12,754,678 B2
(45) Date of Patent: Oct. 6, 2026

(54) SESSION BASED STORAGE DEVICE LOCKING MECHANISM

(71) Applicant: SanDisk Technologies LLC, Austin, TX (US)

(72) Inventors: Lovish Singla, Bangalore (IN); Lovleen Arora, Bangalore (IN)

(73) Assignee: SanDisk Technologies INC, Milpitas, CA (US)

( * ) Notice: Subject to any disclaimer, the term of this patent is extended or adjusted under 35 U.S.C. 154(b) by 227 days.

(21) Appl. No.: 18/640,849

(22) Filed: Apr. 19, 2024

(65) Prior Publication Data

US 2025/0328263 A1 Oct. 23, 2025

(51) Int. Cl.
*G06F 3/06* (2006.01)

(52) U.S. Cl.
CPC .......... *G06F 3/0622* (2013.01); *G06F 3/0637* (2013.01); *G06F 3/0679* (2013.01)

(58) Field of Classification Search
CPC ..... G06F 3/0622; G06F 3/0637; G06F 3/0679
USPC ........................................................... 711/64
See application file for complete search history.

(56) References Cited

U.S. PATENT DOCUMENTS 8,812,860 B1 8/2014 Bray
10,963,592 B2 3/2021 Sasidharan
11,782,621 B2 10/2023 Klapman
2006/0095782 A1* 5/2006 Nunnelley ........... H04L 9/0891 713/184
2009/0249014 A1* 10/2009 Obereiner ........... G06F 12/1441 711/163
2012/0151101 A1* 6/2012 Matsuo ................. G06F 3/0673 710/18
2014/0282893 A1* 9/2014 Sheller .................... H04L 63/08 726/4
2015/0127952 A1* 5/2015 Bowman ........... G11B 20/0021 713/189
2015/0199534 A1 7/2015 Francis
2017/0026353 A1* 1/2017 Chen ..................... H04L 63/061
2020/0004451 A1* 1/2020 Prohofsky ............. G06F 3/0604
2021/0014221 A1* 1/2021 Kukreja ................ H04L 63/108
2021/0382649 A1* 12/2021 Muthiah ............... G06F 3/0659
2022/0391117 A1* 12/2022 Arunkumar ............ G06N 20/00

FOREIGN PATENT DOCUMENTS

CN 103530580 A 1/2014

* cited by examiner

*Primary Examiner* — Reginald G Bragdon
*Assistant Examiner* — Aaron D Ho
(74) *Attorney, Agent, or Firm* — Arlene P. Neal; NEAL BLIBO LLC

(57) ABSTRACT

A storage device restricts host access to data on the storage device. A controller on the storage device determines that a session protection feature is enabled on the storage device, initiates a session on the storage device, and sets a timer to an initial time. The controller obtains a session timeout value, calculates a session time, and stores the session time in a master index page. The controller further determines when a power reset has occurred and that the storage device is unlocked, initializes the timer with a session time value stored in the master index page prior to the power reset, and continues to calculate the session time. The controller compares the session time with the session timeout value and locks the storage device when the session time exceeds the session timeout value.

19 Claims, 6 Drawing Sheets

200

| COMMAND | BIT 7 | BIT 6 | BIT 5 | BIT 4 | BIT 3 | BIT2 | BIT 1 | BIT 0 |
|---|---|---|---|---|---|---|---|---|
| 0 | RESERVED | | SET SESSION | COP | ERASE | LOCK UNLOCK | CLR_PWD | SET_PWD |
| 1 | PWDS_LEN | | | | | | | |
| 2 | PASSWORD DATA | | | | | | | |
| ... | | | | | | | | |
| PWDS_LEN + 1 | | | | | | | | |
| PWDS_LEN + 2 | SESSION TIMEOUT VALUE | | | | | | | |

FIG. 2

SESSION BASED STORAGE DEVICE LOCKING MECHANISM

BACKGROUND OF THE INVENTION

A storage device may be communicatively coupled to a host and to non-volatile memory including, for example, a NAND flash memory device on which the storage device may store data received from the host. The host may execute multiple applications that may access the data stored on the memory device while the storage device is running. Some host applications may access data in the foreground, wherein a user on the host may be aware that the host application is accessing the data or in the background where the user may be unaware of the data access. Some host applications may include tracking features that may be disabled by the user when those applications are running in the foreground and being accessed by the user. Host applications with disabled tracking features may also access data on the storage device when operating in the background.

Storage devices may include a lock/unlock protection mechanism. With the lock/unlock protection, a storage device may be locked using a password and data access may be provided to the host when the storage device is unlocked with the password. Once the storage device is unlocked, it may remain unlocked until a power reset/power cycle occurs, or the user/host explicitly locks the storage device. In a case where the host is powered on for a long period of time, the storage device may remain in an unlocked state even if there is no user accessing the host and/or transferring files to the storage device. As such, while the storage device is unlocked, multiple host applications operating in the background may access data through the storage device.

During active periods when the user is accessing the host, the user may determine which applications are running in the foreground and background and the user may terminate execution of foreground and/or background applications. For example, a user of a laptop may use a task manager feature to identify applications running in the foreground and/or background and terminate execution of one or more applications running on the laptop. However, during idle periods when the user is not accessing the host and the host has not been explicitly powered off or shutdown, the user has no way to identify applications running on the host to terminate execution of such applications. While the storage device is unlocked, there is no data security solution to prevent or restrict access to data through the storage device during idle periods.

SUMMARY OF THE INVENTION

In some implementations, the storage device may restrict host access to data. The storage device includes a memory device to store data. The storage device also includes a controller to determine that a session protection feature is enabled on the storage device. The controller may initiate a session on the storage device and obtain a session timeout value. The controller may also execute a session protection mechanism using the session timeout value, wherein the session protection mechanism may restrict host access to data on the memory device.

In some implementations, a method is provided on a storage device for restricting host access to data on the storage device. The method includes determining that a session protection feature is enabled on the storage device and initiating a session on the storage device and setting a timer to an initial time. The method also includes obtaining a session timeout value and calculating a session time. The method further includes comparing the session time to the session timeout value and locking the storage device when the session time exceeds the session timeout value.

In some implementations, a method is provided on a storage device for restricting host access to data on the storage device. The method includes determining that a session protection feature is enabled on the storage device, initiating a session on the storage device, and setting a timer to an initial time. The method also includes obtaining a session timeout value, calculating a session time, and storing the session time in a master index page. The method further includes determining when a power reset has occurred and that the storage device is unlocked, initializing the timer with a session time value stored in a master index page prior to the power reset, and continuing to calculate the session time. The method also includes comparing the session time to the session timeout value and locking the storage device when the session time exceeds the session timeout value.

BRIEF DESCRIPTION OF THE DRAWINGS

FIG. 2 is a block diagram showing a data structure used in implementing a session protection mechanism on a storage device in accordance with some implementations.

Figure 1:
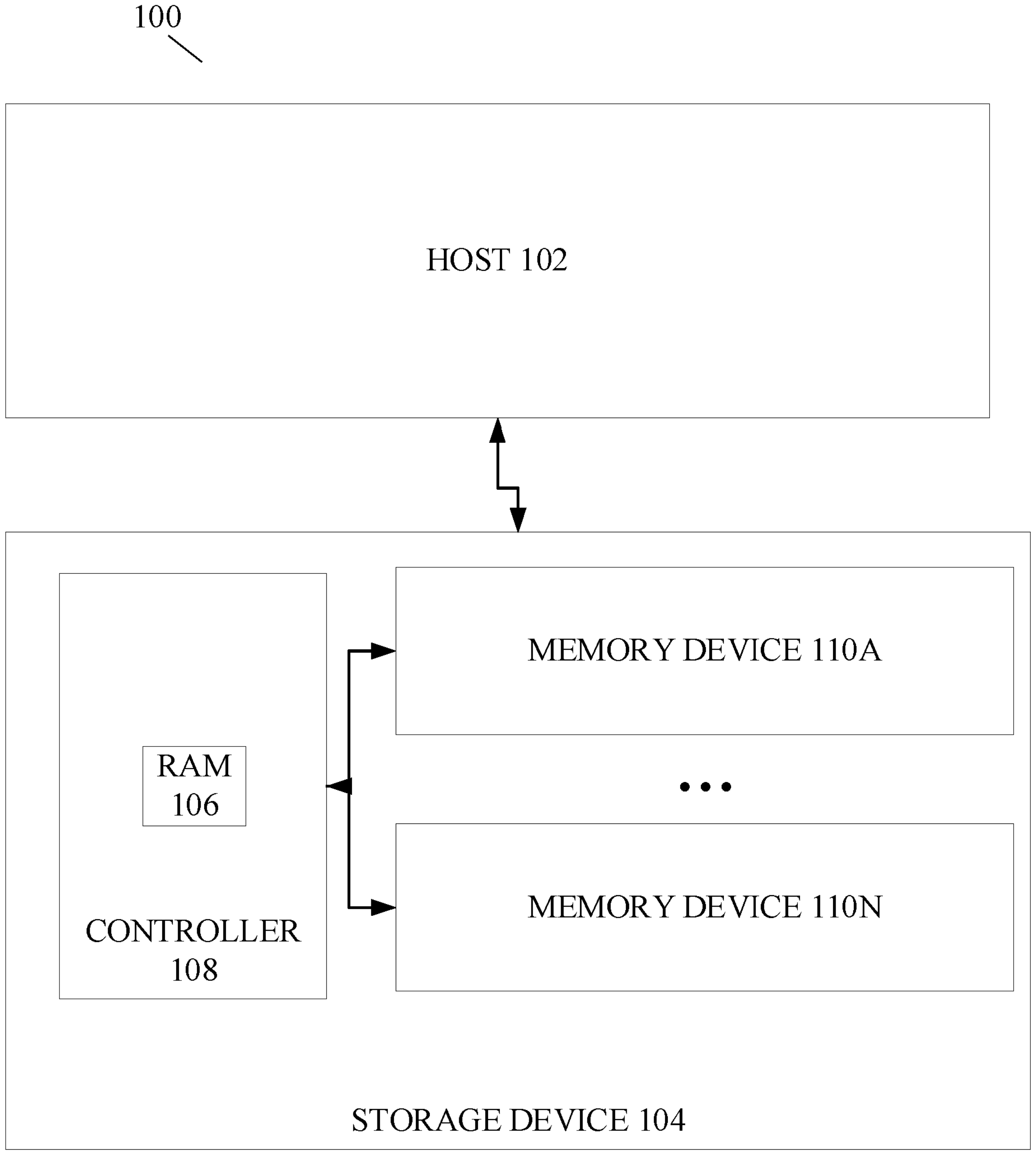
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110*a*-110*n* (referred to herein as the memory device(s) 110). Storage device 104 may be, for example, a solid-state drive (SSD), and the like. RAM 106 may be temporary storage such as dynamic RAM (DRAM) or a static RAM (SRAM) that may be used to cache information.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104.

Controller 108 may implement a session protection mechanism on storage device 104, The session protection mechanism may be provided in addition to a lock/unlock protection mechanism. As part of the session protection mechanism, controller 108 may use a session timeout parameter which may include a predefined/default session timeout value that may be stored on storage device 104. The session timeout parameter may also be configurable, wherein storage device may obtain the session timeout value from host 102. The session timeout value may be a period of seconds, milliseconds, minutes, or hours, depending on the requirements of storage device 104.

In some implementations, once storage device 104 is unlocked with, for example, a password, controller 108 may determine if a session protection feature is enabled on storage device 104 and start a session on storage device 104, if the session protection feature is enabled. In other implementations, controller 108 may start a session on storage device 104 when storage device is powered on if, for example, the lock/unlock feature is disabled on storage device and the session protection feature is enabled on storage device. The time the session starts is referred to herein as an initial time and controller 108 may set a timer to the initial time. Controller 108 may monitor/calculate a session time, i.e., the elapsed period from the initial time to the current time and compare the session time with the session timeout value. If the session time exceeds the session timeout value, controller 108 may complete pending host commands and lock storage device 104. By locking storage device 104, controller 108 may prevent further host access to data stored on memory device 110 until storage device is unlocked by host 102 with, for example, a password. In some cases, when controller 108 locks storage device 104, controller may continue to process background operations on storage device 104.

Controller 108 may use a lock/unlock data structure or vendor specific commands to implement the session protection mechanism on storage device 104. For example, controller 108 may use CMD42, i.e., a data structure that enables host 102 to use a password to lock and unlock some storage devices including, for example, secure digital (SD) cards. Controller may use the session timeout parameter in the CMD42 structure to store the session timeout value. The session timeout parameter may be four bytes which may be increased or reduced, depending on the type and/or requirements of storage device 104. The session timeout value may be placed at different offsets in the CMD42 structure. For example, the session timeout parameter may be added at the end of a password data parameter.

Controller 108 may use a reserved bit in CMD42 to determine if a session timeout feature is enabled. For example, controller 108 may use Bit 5 in the CMD42 structure to determine if a session lock bit has been set. When host 102 unlocks storage device 104 with a password, controller 108 may determine if, for example, Bit 5 is set. If Bit 5 is set, controller 108 may enable the session protection mechanism and retrieve either a default or configurable session timeout value. Controller 108 may then initiate a session, start a timer, and periodically calculate an elapsed session time, i.e., the period from the initial time to the current time. In some cases, controller 108 may calculate the elapsed session time prior to executing an incoming host command. Controller 108 may store the elapsed time in a master index page (MIP) after predefined intervals.

If a power reset/power cycle occurs on storage device 104 and storage device 104 is not in a locked state when storage device 104 is restarted, controller 108 may initialize the timer with the last elapsed time value that was stored in the MIP prior to the power reset if the session protection feature is enabled on storage device 104. Controller 108 may continue to calculate the session time, wherein the session time may be the time retrieved from the MIP added to the elapsed period from when storage device 104 was restarted to the current time. When the session time exceeds the session timeout value, controller 108 may set the lock bit high and lock storage device, wherein host 102 may be prevented from having further data access via storage device 104. If a power reset/power cycle occurs on storage device 104 and storage device 104 is in a locked state, when host 102 unlocks storage device 104, if the session protection feature is enabled on storage device 104 controller 108 may start a new session, initialize the timer to the initial time, i.e., the times the session starts, calculate the session time, compare the session time with the session timeout value, and when the session time exceeds the session timeout value, set the lock bit high and lock storage device 104.

In cases where host 102 is transferring files and the session time exceeds the session timeout value, controller 108 may complete the pending host commands and file transfers prior to locking storage device 104. To avoid interruptions to ongoing host operations, controller 108 may compare the session timeout value to the session time prior to starting a host command or during an idle period. Controller 108 may also enhance security wherein controller 108 may define the number of allowable fail attempts (wrong password entered) on storage device 104, after which controller 108 may erase data stored on memory device 110.

Storage device 104 may perform these processes based on a processor, for example, controller 108 executing software instructions stored by a non-transitory computer-readable medium, such as storage component 110. As used herein, the term “computer-readable medium” refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

FIG. 2 is a block diagram showing a data structure used in implementing a session protection mechanism on a storage device in accordance with some implementations. Data structure 200 may be a lock/unlock command data structure such as CMD42 used on SD cards. Data structure 200 may include Bits 0-7 and a command field. Bits 0-4 may be used by a lock/unlock mechanism to lock/unlock storage device 104 with, for example, a password. Bit 5 may be used to determine if a session lock is valid to implement the session protection mechanism on storage device 104. Bits 6 and 7 may be reserved for future use Command 0 may be associated with the bit values for Bits 0-7, wherein the value of Bit 0 may be used to set a password, the value of Bit 1, may be used to clear a password, the value of Bit 2 may be used lock or unlock storage device 104, the value of Bit 3 may be used erase the password content, the value of Bit 4 may be used to indicate card ownership protection (COP) feature operations, and the value of Bit 5 may be used to indicate if the session lock bit has been set.

Command 1 may be associated with a password length, commands 2-PWDS_LEN+1 may be associated with password data, and PWDS_LEN+2 may be associated with a session timeout parameter including a session timeout value. The session timeout parameter may be four bytes which may be increased or reduced, depending on the type and/or requirements of storage device 104. The session timeout value may be placed at different offsets data structure 200. As an example, the session timeout parameter is added at the end of a password data. When host 102 unlocks storage device 104 with a password, controller 108 may determine if, for example, Bit 5 is set. If Bit 5 is set, controller 108 may enable the session protection mechanism using either with a default or configurable session timeout value.

CMD42 is only provided as an example. Controller 108 may obtain the session timeout value and determine if the session lock bit has been set through other vendor specific commands or other data structures. As indicated above FIG. 2 is provided as an example. Other examples may differ from what is described in FIG. 2.

Figure 3:
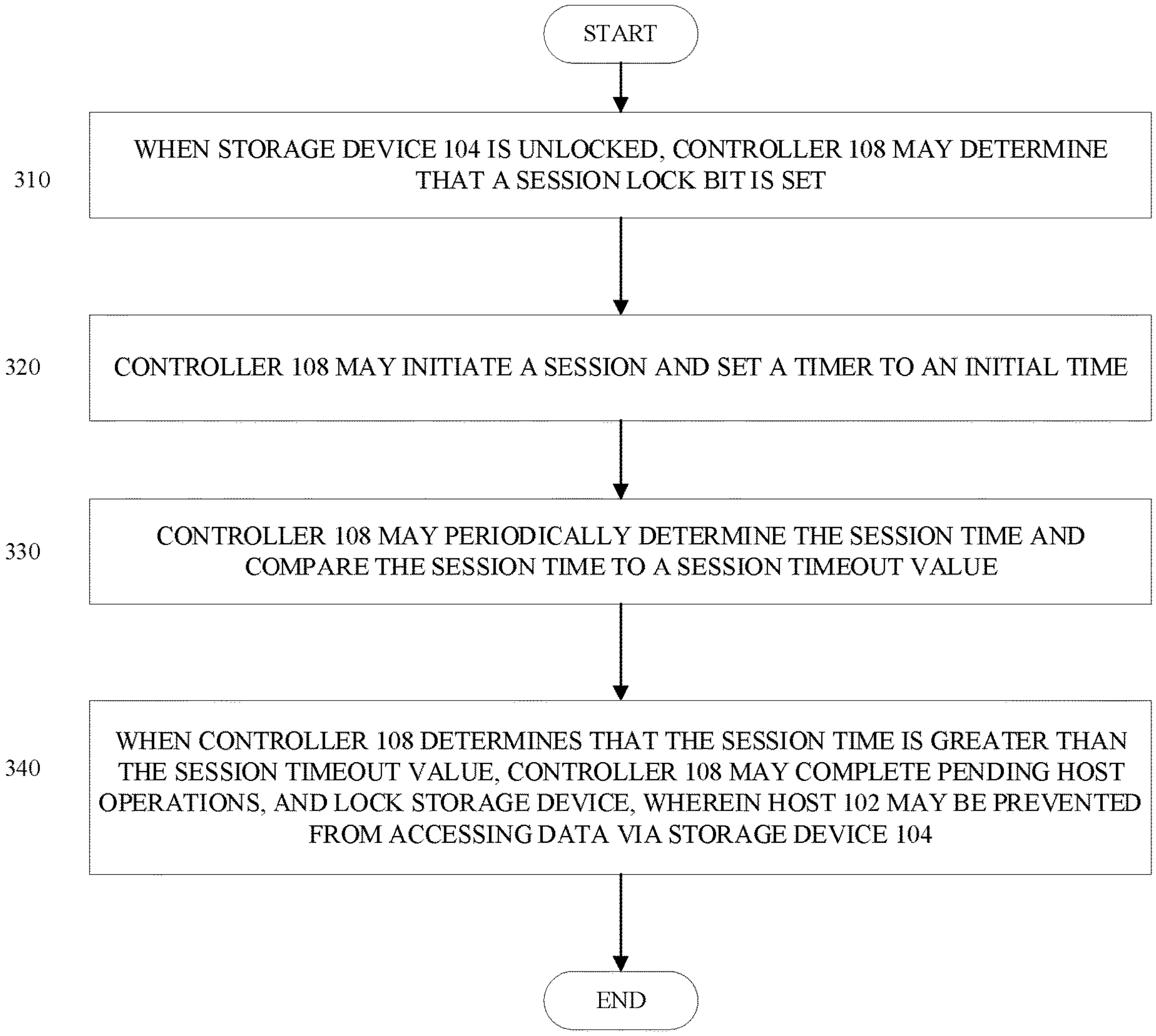
FIG. 3 is a flow diagram of an example process for implementing the session protection mechanism on a storage device in accordance with some implementations.

FIG. 3 is a flow diagram of an example process for implementing the session protection mechanism on a storage device in accordance with some implementations. At 310, when storage device 104 is unlocked, controller 108 may determine that a session lock bit is set. At 320, controller 108 may initiate a session and set a timer to an initial time. At 330, controller 108 may periodically determine the session time and compare the session time to a session timeout value. At 340, when controller 108 determines that the session time is greater than the session timeout value, controller 108 may complete pending host operations, and lock storage device, wherein host 102 may be prevented from accessing data via storage device 104. As indicated above FIG. 3 is provided as an example. Other examples may differ from what is described in FIG. 3.

Figure 4:
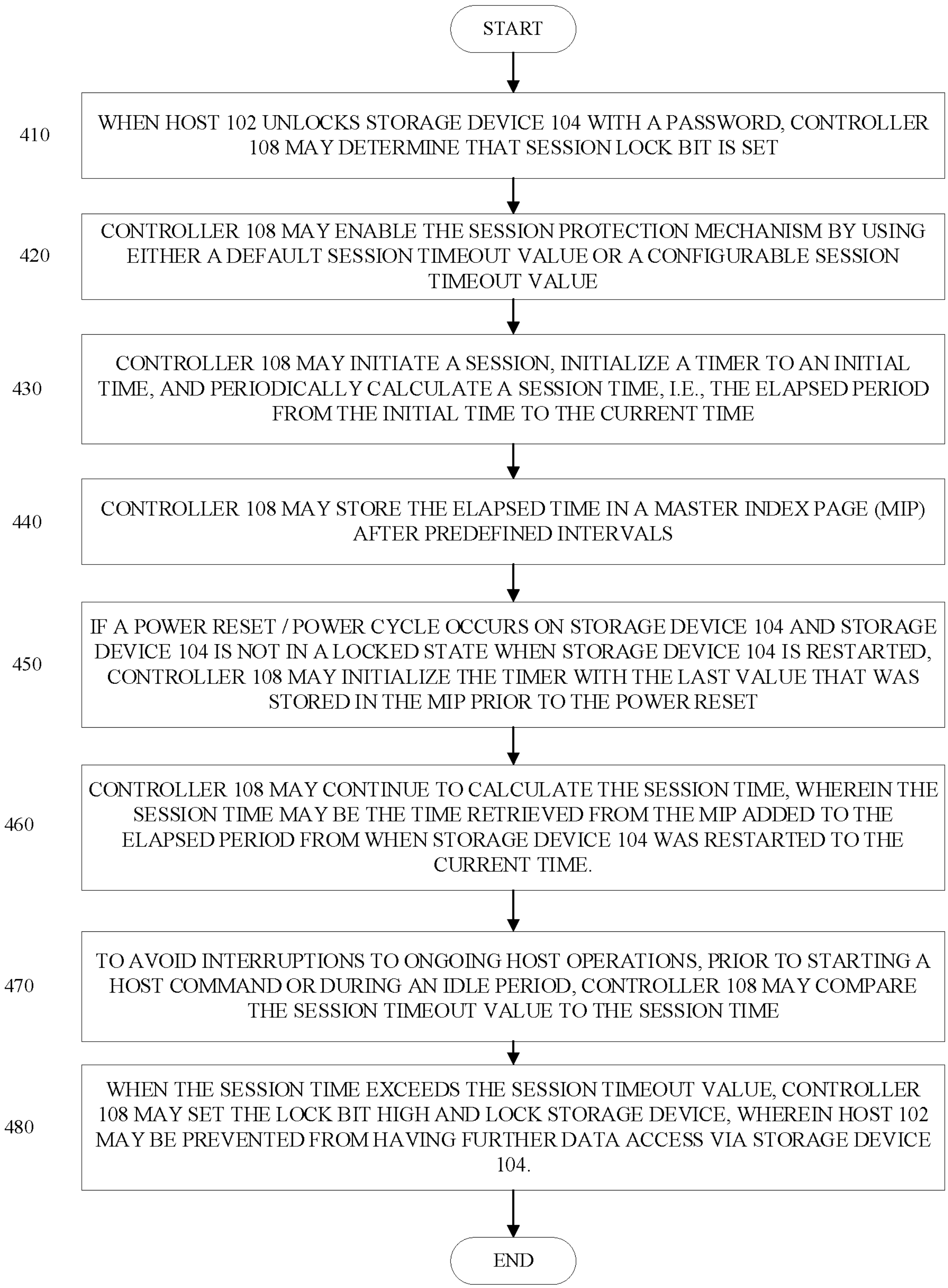
FIG. 4 is another flow diagram of an example process for implementing a session protection mechanism on the storage device in accordance with some implementations.

FIG. 4 is another flow diagram of an example process for implementing a session protection mechanism on the storage device in accordance with some implementations. At 410, when host 102 unlocks storage device 104 with a password, controller 108 may determine that session lock bit is set. At 420, controller 108 may enable the session protection mechanism by using either a default session timeout value or a configurable session timeout value. At 430, controller 108 may initiate a session, initialize a timer to an initial time, and periodically calculate a session time, i.e., the elapsed period from the initial time to the current time. At 440, controller 108 may store the elapsed time in a master index page (MIP) after predefined intervals. At 450, if a power reset/power cycle occurs on storage device 104 and storage device 104 is not in a locked state when storage device 104 is restarted, controller 108 may initialize the timer with the last value that was stored in the MIP prior to the power reset.

At 460, controller 108 may continue to calculate the session time, wherein the session time may be the time retrieved from the MIP added to the elapsed period from when storage device 104 was restarted to the current time. At 470, to avoid interruptions to ongoing host operations, prior to starting a host command or during an idle period, controller 108 may compare the session timeout value to the session time. At 480, when the session time exceeds the session timeout value, controller 108 may set the lock bit high and lock storage device, wherein host 102 may be prevented from having further data access via storage device 104. As indicated above FIG. 4 is provided as an example. Other examples may differ from what is described in FIG. 4.

Figure 5:
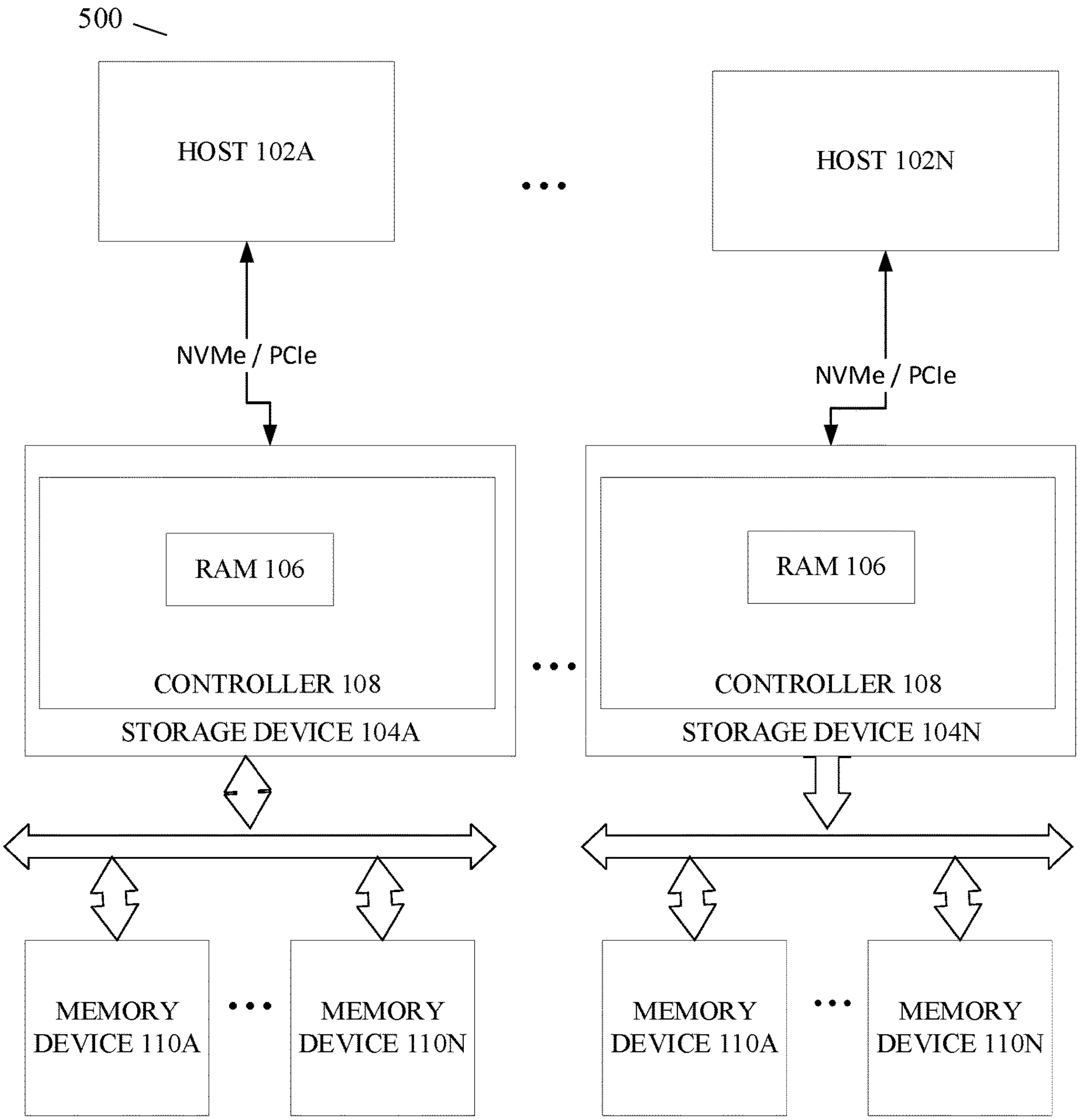
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and one or more storage devices 104*a*-104*n* (referred to herein as storage device(s) 104). Storage device 104 may include a controller 108 to implement a session protection mechanism. Hosts 102 and storage devices 104 may communicate via Non-Volatile Memory Express (NVMe) over peripheral component interconnect express (PCI Express or PCIe), or the like.

Devices of Environment 500 may interconnect via wired connections, wireless connections, or a combination of wired and wireless connections. For example, the network in FIG. 5 may include NVMe over Fabric (NVMe-oF) Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
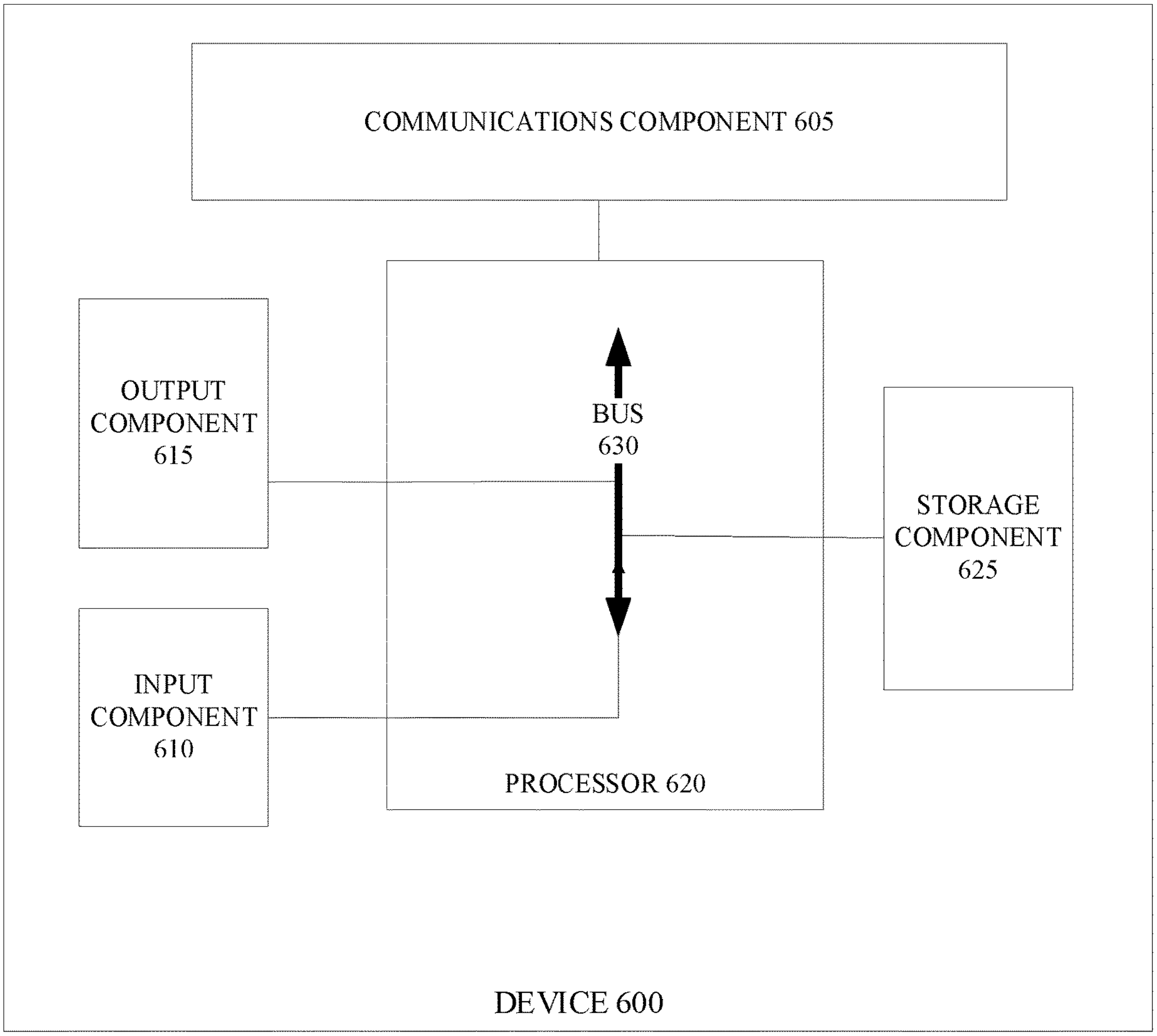
FIG. 6 is a diagram of example components of one or more devices of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, and a network/data connection port, or the like), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and network/data connection port, or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range.

Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to restrict host access to data, the storage device comprises:

a memory device to store data; and a controller to determine that a session protection feature is enabled on the storage device, initiate a session on the storage device, obtain a session timeout value and execute a session protection mechanism using the session timeout value, wherein the session protection mechanism restricts host access to data on the memory device, wherein the controller stores the session timeout value in a session timeout parameter included in a data structure, wherein a size of the session timeout parameter is one of increased and decreased depending on requirements of the storage device.

2. The storage device of claim 1, wherein the session timeout value is one of a predefined value stored on the storage device and a configurable value provided by a host.

3. The storage device of claim 1, wherein the controller initiates the session when the storage device is unlocked.

4. The storage device of claim 1, wherein in executing the session protection mechanism the controller sets a timer to an initial time, calculates a session time, compares the session time to the session timeout value, and locks the storage device when the session time exceeds the session timeout value.

5. The storage device of claim 4, wherein the controller calculates the session time to include an elapsed time between the initial time and a current time.

6. The storage device of claim 4, wherein the controller determines the session time prior to executing an incoming host command.

7. The storage device of claim 4, wherein the controller stores the session time in a master index page.

8. The storage device of claim 4, wherein after a power reset, if the storage device is unlocked, the controller initializes the timer with a session time value stored in a master index page prior to the power reset.

9. The storage device of claim 8, wherein the controller calculates the session time to include a sum of the session time value retrieved from the master index page and an elapsed period from when the storage device was restarted to a current time.

10. The storage device of claim 1, wherein the controller compares the session timeout value to a session time one of prior to starting a host command and during an idle period.

11. The storage device of claim 1, wherein in executing the session protection mechanism the controller completes pending hosts commands prior to locking the storage device.

12. The storage device of claim 1, wherein the controller uses a bit in the data structure to determine if the session timeout feature is enabled.

13. The storage device of claim 1, wherein the controller defines a number of allowable fail login attempts on the storage device and erases data stored on the memory device when failed login attempts exceed the number of allowable fail login attempts.

14. A method for restricting host access to data on a storage device, wherein the storage device comprises a controller to execute the method comprising:

determining that a session protection feature is enabled on the storage device;

initiating a session on the storage device and setting a timer to an initial time;

obtaining a session timeout value;

calculating a session time;

comparing the session time to the session timeout value; and locking the storage device when the session time exceeds the session timeout value, wherein the controller stores the session timeout value in a session timeout parameter included in a data structure, wherein a size of the session timeout parameter is one of increased and decreased depending on requirements of the storage device.

15. The method of claim 14, further comprising initiating the session when the storage device is unlocked.

16. The method of claim 14, further comprising determining the session time prior to executing an incoming host command.

17. The method of claim 14, further comprising comparing the session timeout value to the session time one of prior to starting a host command and during an idle period and completing pending hosts commands prior to locking the storage device.

18. A method for restricting host access to data on a storage device, wherein the storage device comprises a controller to execute the method comprising:

determining that a session protection feature is enabled on the storage device;

initiating a session on the storage device and setting a timer to an initial time;

obtaining a session timeout value;

calculating a session time and storing the session time in a master index page;

determining when a power reset has occurred and that the storage device is unlocked, initializing the timer with a session time value stored in a master index page prior to the power reset, and continuing to calculate the session time;

comparing the session time to the session timeout value; and locking the storage device when the session time exceeds the session timeout value.

19. The method of claim 18, further comprising continuing to calculate the session time to include a sum of the session time value retrieved from the master index page and an elapsed period from when the storage device was restarted to a current time.

* * * * *